US006412935B1

(12) United States Patent
Doumaux

(10) Patent No.: US 6,412,935 B1
(45) Date of Patent: Jul. 2, 2002

(54) APPLICATION OF CLEAR OVERCOAT FLUID

(75) Inventor: Howard A. Doumaux, San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/572,714

(22) Filed: May 16, 2000

(51) Int. Cl.[7] .................................... G01D 11/00

(52) U.S. Cl. ........................ 347/99; 347/100; 347/101

(58) Field of Search ........................ 347/100, 99, 101, 347/105, 96

(56) References Cited

U.S. PATENT DOCUMENTS 5,536,306 A 7/1996 Johnson et al. ........... 106/22 R
5,679,143 A 10/1997 Looman ................... 106/20 R
5,746,818 A * 5/1998 Yatake ....................... 347/100
5,785,743 A * 7/1998 Adamic et al. ............ 347/100
6,238,047 B1 * 5/2001 Suzuki et al. ............... 347/100

* cited by examiner

*Primary Examiner*—John Barlow
*Assistant Examiner*—Manish S Shah

(57) ABSTRACT

A method of applying a fixer fluid overcoat to a porous or semi-porous medium printed in an ink jet printer is provided. The method includes: (a) providing at least one ink including a colorant and contained in at least one ink-printing pen maintained within the ink jet printer; (b) providing the fixer fluid in a fixer fluid pen maintained within the ink jet printer; (c) printing the ink(s) on the print medium; and (d) overprinting the ink(s) with the fixer fluid by advancing the print medium a few dot rows per print swath and either (i) applying the fixer fluid to the ink(s) on an $N^{th}$ pass where the fixer fluid pen trails the ink-printing pen(s), or (ii) printing an additional swath without an advance of the print medium with the fixer fluid where the fixer fluid pen leads the ink-printing pen(s).

22 Claims, 1 Drawing Sheet

APPLICATION OF CLEAR OVERCOAT FLUID

CROSS-REFERENCE TO RELATED APPLICATION

The present application is related to application Ser. No. 09/572,712, filed on even date herewith. The present application is directed to the mechanics of over-printing a fixer fluid, while the related application is directed to the composition of the fixer fluid, media type/composition, and ink formulation.

TECHNICAL FIELD

The present invention is related generally to ink jet printing and, more particularly, to improving the waterfastness of the printed ink.

BACKGROUND ART

Ink jet color printers commonly have four separate color pens, or cartridges: cyan, yellow, magenta, and black, for providing a full gamut of colors and hues. Such ink jet color printers are commonly called "four pen" printers, for obvious reasons.

Porous media has been shown to give instant dry time printing with an ink jet printer. However, print quality, as evidenced by waterfastness, for example, may be compromised by improving other qualities, such as dry time.

With an increased demand for outdoor signage and window displays, efforts have been made to increase the durability of ink jet print by printing pigmented inks on porous media, such as adjusting the pH in the coating. However, adjusting the coating pH is sometimes not desirable, due to flocculation of the coating fluid at desired pH or image quality (IQ) tradeoff (coalescence becomes worse at lower pH based on previous work). Also, for media which are not designed to work with certain ink sets, durability is impossible to be achieved without post processing, e.g., lamination. It is known that the media can be laminated to increase durability; however, it is costly, error prone, and labor intensive.

Thus, there is a need for improved waterfastness on printed porous media without the need for post processing.

DISCLOSURE OF INVENTION

In accordance with the present invention, a method of applying a fixer fluid overcoat to a porous or semi-porous medium printed in an ink jet printer is provided. The method comprises:

(a) providing at least one ink including a colorant and contained in at least one ink-printing pen maintained within the ink jet printer;

(b) providing the fixer fluid in a fixer fluid pen maintained within the ink jet printer;

(c) printing the ink(s) on the print medium; and (d) overprinting the ink(s) with the fixer fluid by advancing the print medium a few dot rows per print swath and either (i) applying the fixer fluid to the ink(s) on an $N^{th}$ pass where the fixer fluid pen trails the ink-printing pen(s), or (ii) printing an additional swath without an advance of the print medium with the fixer fluid where the fixer fluid pen leads the ink-printing pen(s).

The method of the present invention provides the following advantages:

(1) on porous media, solely overprinting a fixer fluid allows for larger dot gain than when the fluid is underprinted, or some combinations of underprinting and overprinting;

(2) even head wear of the printhead, as the present invention allows all nozzles in the fixer pen to be used during multipass printmodes;

(3) printheads can be placed in a non-staggered arrangement, resulting in a small print zone, slightly higher throughput, and lower swath memory requirements.

BEST MODES FOR CARRYING OUT THE INVENTION

The wet rub durability, smearfastness, and waterfastness of pigmented inks printed on porous and/or semi-porous alumina- or silica-coated media (also called porous or semi-porous media) may be enhanced by lamination, which can be costly and prone to operator error. A more desirable procedure would be to have the printer apply the overcoat fixer fluid during the printing process, resulting in a durable print immediately out of the printer.

Dry-time is enhanced by using porous coatings containing alumina or silica. Capillary force draws the fluid into the porous matrix and fills the pores much faster than relying on polymer swelling in other conventional, non-porous coatings. Depending on pore volumes existing in the porous coating, sometimes underprinting is less desirable because the fixer fluid may fill the pores, resulting in ink flooding, or excess ink flowing on the surface of the print medium, when ink is printed.

The alumina-and silica-based coatings noted above are substantially transparent and should not adversely impact the hue, chroma, or optical density of the inks. The transparent nature of these coatings differentiates them from "plain paper" media, penetration of the inks into these media substantially reduces their chroma and optical density. By using an underprinted fixer fluid, it is possible to raise the chroma and optical density of pigment-based and dye-based inks on plain paper. However, it is expected to be desirable to overprint the fixer fluid rather than underprinting (or some combination of over- and underprinting) the fixer fluid when silica- or alumina-coated media are used. Application of the fixer fluid may also result in undesirable area fill nonuniformity due to immediate flocculation of the color pigment. The porous coating may also serve to encapsulate the pigment and add mechanical durability. Underprinting with fixer fluids tends to inhibit penetration of the pigment into the media, trapping the pigment particles near or on the media surface.

Silica- and alumina-coated media have been shown to require multi-pass printing in order to deliver high image quality (IQ) and reasonable throughput. In a multi-pass printmode, only the terminal $1/N_{pass}$ nozzles of the fixer pen would operate the terminal nozzles, where $N_{pass}$ is the number of passes in the printmode. A substantial portion of the pen nozzles would not be utilized, exerting undue load on the nozzles in use. In a printer primarily devoted to plain paper printing, this type of print mode may be acceptable, as a small portion of the printer's life would be spent print on porous/semi-porous media. However, large-format or specialty printers under consideration are generally designed to print on porous/semi-porous media for the majority of their life. Therefore, it is desirable to spread the duty cycle over the entire printhead to enhance printhead life.

Figure 1:
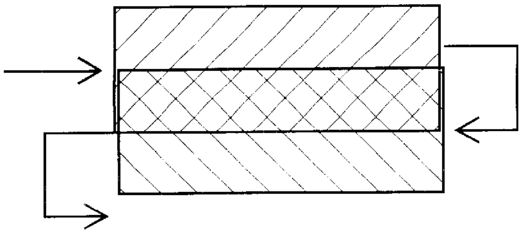
FIG. 1 is a schematic representation depicting a conventional two-pass print mode comprising printing a swath on a print medium and advancing the print medium by one-half swath height and printing the remainder of the top portion of the swath and the first half of the lower swath.

One way of doing this is to utilize a variant on a printmode developed within Hewlett-Packard Company for eliminating hue shifts caused by bi-directional printing on plain paper; see, e.g., application Ser. No. 09/363,943, filed Jul. 29, 1999. This printmode works by printing a first printing a swath, and then advancing the paper a small number of dot rows to help reduce banding due to misdirected or missing nozzles (for a two-pass printmode, the prior art practice is to advance the paper one-half of the swath height, as shown in FIG. 1). The return swath then covers nearly the same portion of the paper. This printmode thus forces the hue shift into a few dot rows per swath.

Figure 2:
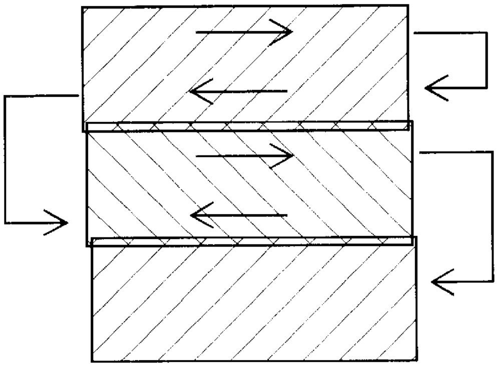
FIG. 2 is a view similar to that of FIG. 1, but depicting a modified print mode comprising printing a swath on a print medium and advancing the print medium a few dot rows, printing the remainder of the top portion of the swath and the first portion of the lower swath, then advancing the print medium nearly a full swath.
Figure 3:
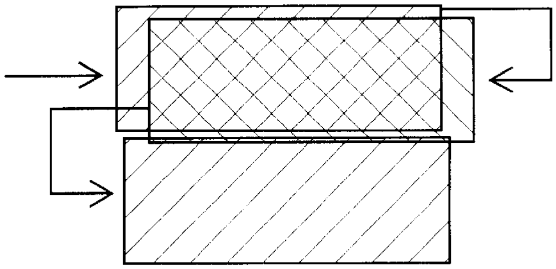
FIG. 3 is a view similar to that of FIG. 2, but depicting the combination of the modified print mode with also overprinting a fixer.

A similar method may also be used to apply the fixer fluid overcoat. The image is still printed in a series of swaths, but instead of performing a $N_{nozzles}/N_{pass}$ dot row advance, the media is not advanced or is only advanced a few dot rows per pass; $N_{nozzles}$ is the number of nozzles in use on the printhead and $N_{pass}$ is the number of passes in the printmode. On the Nth pass, the fixer fluid is applied if the fixer fluid pen is trailing the printing pens. If the fixer fluid pen is leading on this swath, an additional swath is printed without a media advance. Only the fixer fluid pen prints on this pass. The media is then advanced the full swath height of the pen minus the cumulative number of dot rows advanced in the printing process (see FIG. 2). If an odd number of passes are used, this method may require an additional swath per section of media printed. If two overcoat fixer fluid pens are used, no additional swaths are required (it is presumed that the fixer fluid pen(s) resides at the one (or both) ends of the pen cartridge). An additional refinement of this technique is to position the fixer fluid pen slightly behind the other pens so that it can overprint the dots advanced out of the normal print zone during the printing process and to prevent migration of the fixer fluid into the region being printed (see FIG. 3).

Figure 4:
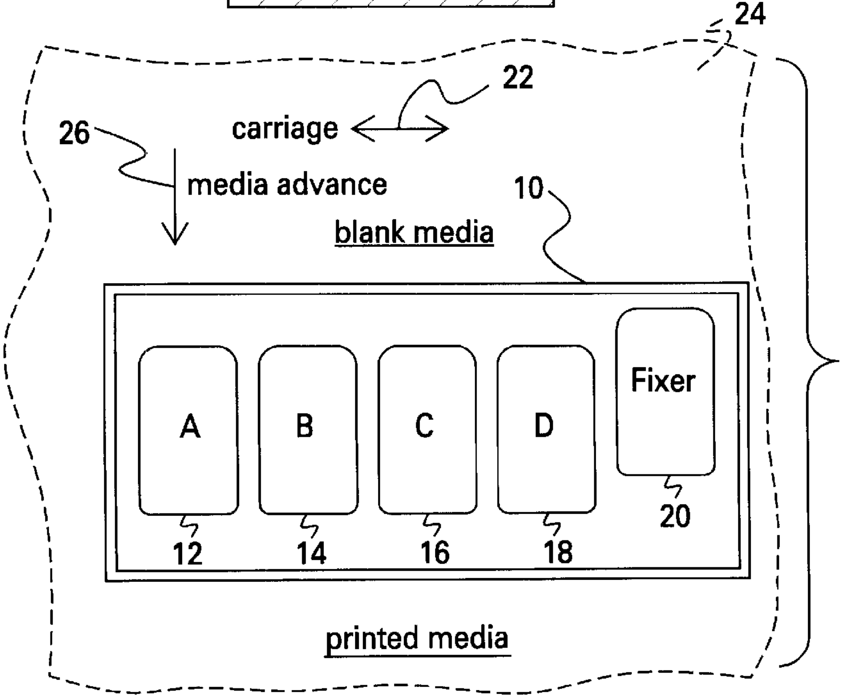
FIG. 4 is a top plan view depicting a five pen carriage design, combining four color pens and a fixer pen.

As shown in FIG. 4, the carriage 10 of a printer thus comprises four pens 12, 14, 16, and 18, each containing one of the colors cyan, yellow, magenta, and black. A fifth pen 20 contains the fixer fluid. The motion of the carriage is bi-directional across the paper, as indicated by arrow 22, while the print medium (e.g., paper) 24 advances along the paper, as indicated by arrow 26.

Although a bi-directional example is described above, uni-directional printing is also an optional way of employing this technique.

The fixer fluid contained in the fifth pen 20 comprises at least one organic acid and, optionally, at least one salt of a polymeric acid. Examples of organic acids that may be suitably employed in the practice of the invention include, but are not limited to, mono-, di-, and polyfunctional organic acids. In general, it is contemplated that any water-soluble organic acid having a pKa equal to or less than that of the pH-sensitive colorant of concern may be suitably employed. Preferably, one of the following classes of organic acids is employed: acetic, glycolic, malonic, malic, maleic, ascorbic, succinic, glutaric, fumaric, citric, tartaric, lactic, sulfonic, and ortho-phosphoric acid and derivatives thereof. Examples of polymeric acids include polyacrylic acid, polyvinyl phosphonic acid and other polymers with phosphate groups ($R—PO_3$ or $R—O—PO_3$), polystyrene sulfonic acid, and polymers containing sulfonate and carboxylate groups. The cation associated with the polymeric acid may comprise sodium, ammonium, or potassium. The polymeric acid salt acts as a buffer.

The fixer fluid has a pH in the range of about 2 to 5. A pH less than about 2 is too corrosive for the ink jet print cartridge components, while a pH greater about 5 adversely affects the ability of the fixer to destabilize the pigment dispersion, "fixing" the pigment to the page.

The total concentration of organic acid and polymeric acid salt is within the range of about 1 to 15 wt % of the fixer fluid.

Preferably, succinic acid is employed as the organic acid, in a concentration within the range of about 2 to 7 wt % of the fixer, preferably at a pH of about 4, as adjusted with a base, such as sodium hydroxide or β-alanine. The sodium salt of polyacrylic acid (mw=2,000 or mw=20,000) having a concentration within the range of about 1 to 10 wt % of the fixer may additionally be employed in the practice of the present invention.

Other preferred organic acids include citric acid and glycolic acid. Preferred polymeric acids include polyvinyl phosphonic acid and polystyrene sulfonic acid.

The fluid fixer also includes co-solvents commonly employed in the inks, such as 1,5-pentanediol, 2-pyrrolidone, and 2-ethyl-2-(hydroxymethyl)-1,3-propanediol. Other co-solvents may also be used, along with additional components often found in ink jet inks, such as surfactants, biocides, and the like, for controlling printability and reliability in ink jet printing.

Other components commonly added to ink-jet inks, such as solvents, penetrants, biocides, and the like, may also be added to the fixer solution of the present invention for improving pen performance and reliability. Such other components may include ammonium nitrate, EHPD (2-ethyl-2-(hydroxymethyl)-1,3-propanediol), 1,5-pentanediol, and/or 2-pyrrolidone.

While much of the discussion above is directed to inks in which the colorant is pigment-based, the teachings of the present invention are also applicable to dye-based inks.

INDUSTRIAL APPLICABILITY

The method of applying a fixer fluid overcoat to a porous or semi-porous medium printed in an ink jet printer is expected to find use in improving waterfastness in ink jet printing.

What is claimed is:

1. A method of applying a fixer fluid overcoat to a porous or semi-porous medium provided with an alumina-based or silica-based coating and printed in an ink jet printer, said method comprising:

(a) providing at least one ink including at least one colorant and contained in at least one ink-printing pen maintained within said ink jet printer;

(b) providing said fixer fluid in a fixer fluid pen maintained within said ink jet printer, wherein said fixer fluid comprises at least one organic acid and, optionally, a salt of at least one polymeric acid;

(c) printing said at least one ink on said print medium; and (d) overprinting said at least one ink with said fixer fluid by advancing said print medium a few dot rows per print swath and either (i) applying said fixer fluid to said at least one ink on an $N^{th}$ pass where said fixer fluid pen trails said at least one ink-printing pen, or (ii) printing an additional swath without an advance of said print medium with said fixer fluid where said fixer fluid pen leads said at least one ink-printing pen.

2. The method of claim 1 wherein said organic acid is selected from the group consisting of mono-functional, di-functional, and poly-functional organic acids.

3. The method of claim 2 wherein said organic acid is present in said fixer fluid in a concentration within a range of about 1 to 15 wt %.

4. The method of claim 3 wherein said organic acid is present in said fixer fluid in a concentration within a range of about 2 to 7 wt %.

5. The method of claim 4 wherein said organic acid is selected from the group consisting of acetic, glycolic, malonic, malic, maleic, ascorbic, succinic, glutaric, fumaric, citric, tartaric, lactic, sulfonic, and ortho-phosphoric acid and derivatives thereof.

6. The method of claim 4 wherein said organic acid is selected from the group consisting of succinic acid, citric acid, and glycolic acid.

7. The method of claim 1 wherein said polymeric acid is selected from the group consisting of polyacrylic acid, polyvinyl phosphonic acid, polymers with phosphate groups, polystyrene sulfonic acid, and polymers containing sulfonate or carboxylate groups.

8. The method of claim 7 wherein said salt comprises a cation associated with said polymeric acid and wherein said cation is selected from the group consisting of sodium, ammonium, and potassium.

9. The method of claim 1 wherein polymeric acid is present in said fixer fluid in a concentration within a range of about 1 to 10 wt %.

10. The method of claim 1 wherein said fixer fluid has a pH within a range of about 2 to 4.

11. The method of claim 1 wherein said at least one ink is pigment-based.

12. A method of improving wet-rub durability, smearfastness, and waterfastness of ink jet inks printed on coated porous or semi-porous print media, wherein the coating is an alumina-based or silica-based coating, said method comprising:

(a) providing at least one ink including at least one colorant and contained in at least one ink-printing pen maintained within an ink jet printer;

(b) providing a fixer fluid in a fixer fluid pen maintained within said ink jet printer, wherein said fixer fluid comprises at least one organic acid and, optionally, a salt of at least one polymeric acid;

(c) printing said at least one ink on said print medium; and (d) overprinting said at least one ink with said fixer fluid by advancing said print medium a few dot rows per print swath and either (i) applying said fixer fluid to said at least one ink on an $N^{th}$ pass where said fixer fluid pen trails said at least one ink-printing pen, or (ii) printing an additional swath without an advance of said print medium with said fixer fluid where said fixer fluid pen leads said at least one ink-printing pen.

13. The method of claim 12 wherein said organic acid is selected from the group consisting of mono-functional, di-functional, and poly-functional organic acids.

14. The method of claim 13 wherein said organic acid is present in said fixer fluid in a concentration within a range of about 1 to 15 wt %.

15. The method of claim 14 wherein said organic acid is present in said fixer fluid in a concentration within a range of about 2 to 7 wt %.

16. The method of claim 15 wherein said organic acid is selected from the group consisting of acetic, glycolic, malonic, malic, maleic, ascorbic, succinic, glutaric, fumaric, citric, tartaric, lactic, sulfonic, and ortho-phosphoric acid and derivatives thereof.

17. The method of claim 15 wherein said organic acid is selected from the group consisting of succinic acid, citric acid, and glycolic acid.

18. The method of claim 12 wherein said polymeric acid is selected from the group consisting of polyacrylic acid, polyvinyl phosphonic acid, polymers with phosphate groups, polystyrene sulfonic acid, and polymers containing sulfonate or carboxylate groups.

19. The method of claim 18 wherein said salt comprises a cation associated with said polymeric acid and wherein said cation is selected from the group consisting of sodium, ammonium, and potassium.

20. The method of claim 12 wherein polymeric acid is present in said fixer fluid in a concentration within a range of about 1 to 10 wt %.

21. The method of claim 12 wherein said fixer fluid has a pH within a range of about 2 to 4.

22. The method of claim 12 wherein said at least one ink is pigment-based.

* * * * *